United States Patent Office 2,907,770
Patented Oct. 6, 1959

2,907,770
STABILIZATION OF HETEROCYCLIC COMPOUNDS HAVING A HETERO NITROGEN ATOM

Clyde W. Mertz, Borger, Tex., assignor to Phillips Petroleum Company, a corporation of Delaware No Drawing. Application January 26, 1953
Serial No. 333,391

13 Claims. (Cl. 260—290)

This invention perains to the stabilization of vinyl-substituted heterocyclic compounds having a hetero nitrogen atom. In one of its aspects the invention pertains to the stabilization of vinylpyridine compounds.

It is known that difficulties are encountered in the manufacture of vinylpyridine and other vinyl-substituted heterocyclic nitrogen compounds because of the tendency of these vinyl compounds to polymerize upon standing at room temperature and upon exposure to elevated temperatures. In the case of vinylpyridines the presence of soluble and insoluble polymers is particularly undesirable because vinylpyridine compounds are employed as monomers for use in polymerization reactions and the like. Hence in the preparation of vinylpyridine compounds the steps of distillation and storage have been matters of concern.

In accordance with this invention, for the purpose of overcoming difficulties due to the fact that vinylpyridine compounds are highly susceptible to polymerization, it is proposed to add a novel inhibiting agent or stabilizer. I have discovered that readily polymerizable vinylpyridine compounds can be effectively stabilized against polymerization during distillation and storage by adding salts of dithiocarbamic acid, such as compounds comprising the following general formula

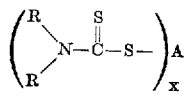

wherein A represents an alkali-metal, an alkaline earth metal or ammonium, where X represents the numerical value for the valence of substituent A, where each R can be hydrogen, methyl, ethyl, propyl, butyl or amyl, or where both R's may be included in a piperidine ring structure, e.g., sodium pentamethylene dithiocarbamate. A preferred group of compounds corresponding to the above general formula is the alkali-metal salts of dialkyl-substituted dithiocarbamic acid. From this preferred group of alkali-metal salts of dialkyl-substituted dithiocarbamic acid two compounds have been selected and have ben found to be effective stabilizing agents, which are sodium dimethyldithiocarbamate and potassium dimethyldithiocarbamate and are known throughout the synthetic rubber industry under trade names as follows: Sodium dimethyldithiocarbamate is known as "Goodrite 3954" and is manufactured by the B. F. Goodrich Chemical Company. Potassium dimethyldithiocarbamate is known by the trade names "Olme" manufactured by the U. S. Rubber Company and "Polystop K" manufactured by the General Tire and Rubber Company. This invention therefore, pertains to a method for treating polymerizable vinylpyridine compounds with salts of dithiocarbamic acid to stabilize the pyridine compounds at distillation temperatures as well as at room temperature and below. The process of this invention however is also applicable to other vinyl-substituted heterocyclic compounds having a hetero nitrogen atom.

The polymerization which is inhibited by the novel stabilizing agents disclosed herein is primarily that which forms an insoluble, hard, porous opaque material often referred to as popcorn polymer. However, polymers are also formed which are soluble in the vinylpyridine reactants and which become apparent by an increase in viscosity. As will be seen from the examples, I have found that soluble polymer formation is also inhibited by the disclosed stabilizing agents, but to a lesser extent than is popcorn polymer formation inhibited.

One group of polymerizable vinyl-substituted heterocyclic compounds containing a hetero nitrogen atom which can be stabilized in accordance with my invention is the mono- and divinylpyridines, with the vinyl group being present in any of the several positions in the pyridine nucleus. Alkyl groups can be present on the ring, or on the alpha carbon atom of the vinyl group, but the number of carbon atoms in the combined alkyl groups should generally not be greater than 12. These alkyl groups are preferably methyl and ethyl groups. Substituents attached to carbon atoms in the ring can be selected from the group consisting of hydrogen, alkyl, vinyl, and not more than two of said groups being vinyl or alpha-methylvinyl; and the total number of carbon atoms in the alkyl groups being not greater than 12. Examples of such compounds are 2-vinylpyridine; 3-vinylpyridine; 4-vinylpyridine; 2,5-divinylpyridine; 2-methyl-5-vinylpyridine; 2-vinyl-5-ethylpyridine; 2,3,4-trimethyl-5-vinylpyridine; 3,4,5,6 - tetramethyl-2-vinylpyridine; 3-ethyl-5-vinylpyridine; 2,6-diethyl-4-vinylpyridine; 2 - isopropyl-4-nonyl-5-vinylpyridine; 2-methyl-5-undecyl-3-vinylpyridine; 3-dodecyl-4,5-divinylpyridine; 2,4-dimethyl-5,6-dipentyl-3-vinylpyridine; 2-decyl-5-(alpha-methylvinyl) pyridine; 3,5-di(alphamethylvinyl)pyridine; and the like.

Other polymerizable heterocyclic compounds containing a hetero nitrogen atom included within the scope of this invention are those vinyl and alpha-methylvinyl substituted heterocyclic nitrogen compounds in which the ring structure is unsaturated, partially saturated and completely saturated. Examples include vinyl and alpha-methylvinyl substituted quinolines, isoquinolines, piperidines (hexahydropyridines), pyrroles, pyrrolidines, pyrrolidones, alkyl derivatives of the foregoing compounds, dihydro and tetrahydropyridines, partially hydrogenated quinolines and isoquinolines, and pyrrolines (dihydropyrroles). Examples of such compounds are 2-vinylquinoline; 8-ethyl-2-vinylquinoline; 4-hexyl-5-vinylquinoline; 1-vinylisoquinoline; 5-methyl-1-isopropenylisoquinoline; 1,8-divinylisoquinoline; vinylpyrrolidone; vinylpyrrole; vinylpiperidine; and vinylpyrrolidine and the like. Normally the vinyl substituent will be attached to a ring carbon atom. However, in compounds wherein the ring nitrogen atom is a secondary nitrogen atom, the vinyl group can instead be attached to this ring nitrogen atom, for example, N-vinylcarbazole and N-vinylpyrrolidone. The process of this invention is particularly applicable to organic or hydrocarbon mixtures containing a substantial proportion of a vinylpyridine compound, i.e. that amount which causes difficulties due to its polymerization, e.g. over 50 percent. Examples of vinylpyridine compounds contained in such mixtures are 2-vinyl-4,6-dimethylpyridine, 2-methyl-4-vinylpyridine, 2-methyl-5-vinylpyridine, 5-ethyl-2-vinylpyridine, 5-amyl-2-vinylpyridine.

In carrying out the invention solution of the stabilizing agent in the vinylpyridine or other heterocyclic compound containing a hetero nitrogen atom to be stabilized can be accomplished in any suitable manner, such as by agitating or stirring the mixture containing the stabilizing agent, or merely by allowing the mixture to stand. Ultimately, the decision on what concentration of the stabilizing agent to use will depend on variable factors, such as the temperature and duration of time at a given temperature at which the heterocyclic compound containing a hetero nitrogen atom will be maintained when inhibition of polymer formation is desired, and economic considerations. In practice a range of concentration of from 0.01 percent to 5.0 percent by weight of the sodium dimethyldithiocarbamate ("Goodrite 3954") or potassium dimethyldithiocarbamate ("Olme" or "Polystop K") will be employed, all percentages being based on the weight of the heterocyclic compound containing a hetero nitrogen atom to be stabilized. Furthermore, the amount will depend somewhat on which particular heterocyclic compound containing a hetero nitrogen atom is concerned, and, as will be apparent from the following examples, upon the particular salt of dithiocarbamic acid being utilized.

EXAMPLE I

A mixture of 2-methyl-5-ethylpyridine and 2-methyl-5-vinylpyridine, containing approximately 90 percent by weight 2-methyl-5-vinylpyridine, was maintained at 190° F. for the following indicated time intervals. To increase the severity of test conditions the mixture of pyridine compounds contained a small amount of divinylpyridine and a small seed of insoluble methylvinylpyridine (popcorn polymer).

*Polymerization of 2-methyl-5-vinylpyridine at 190° F.*

| Sample Description | Polymer Formation Observed |
|---|---|
| (a) Inoculated vinylpyridine mixture. | Mixture almost solid with some popcorn polymer in 8 hours; all popcorn polymer in less than 21 hours. |
| (b) Inoculated vinylpyridine mixture plus 0.6 weight percent "Olme." | Mixture very fluid and no popcorn polymer in 65 hours; mixture a little viscous but no popcorn polymer in 88 hours. |
| (c) Inoculated vinylpyridine mixture plus 1.0 weight percent "Olme." | Mixture very fluid and no popcorn polymer in 65 hours; no popcorn polymer in 88 hours and mixture less viscous than in (b) above. |

In addition to the above it has been found that a quantity as small as 0.05 percent by weight of "Goodrite 3954" was extremely effective to inhibit popcorn polymer formation in 2-methyl-5-vinylpyridine maintained at 190° F. containing a seed of popcorn polymer and a drop of cumene hydroperoxide for up to 72 hours.

From the foregoing it is apparent that salts of dithiocarbamic acid are effective inhibitors of popcorn, or insoluble polymer, formation when heterocyclic compounds having a hetero nitrogen atom are maintained at elevated temperatures, and most remarkably, even when the test solutions are seeded to make the test conditions more severe. Also, it can be seen that these stabilizing agents retard the formation of soluble polymers since sample (c) was less viscous after 88 hours than was sample (b) after 88 hours. The presence of large amounts of soluble polymer is indicated by an increase in viscosity. Smaller amounts can be found by dilution with hexane which yields a white precipitate when soluble polymers are present.

This invention accordingly concerns a method for treating polymerizable vinylpyridine compounds with salts of dithiocarbamic acid at temperatures up to 400° F. as well as at room temperature or below. In accordance with this invention organic mixtures containing vinylpyridine, i.e., vinylpyridine mixed with other organic heterocyclic or pyridine compounds, or purified vinylpyridines, can be stored over long periods of time preferably at room temperature. Likewise, when it is desired to separate a particular vinylpyridine compound from other organic compounds, the stabilized solution can be distilled, preferably at reduced pressure, without any substantial loss of product, the stabilizing agent serving to inhibit polymerization of the vinylpyridine compounds during the process. The instant invention is particularly applicable to mixtures of heterocyclic compounds having a hetero nitrogen atom, containing a substantial proportion of at least one vinyl-substituted heterocyclic compound having a hetero nitrogen atom, i.e., sufficient to cause difficulty due to polymer formation during storage and distillation.

In the practice of this invention the polymer formation inhibiting agents disclosed herein can be used, for example, in the following manner. In the preparation of 2-methyl-5-vinylpyridine from 2-methyl-5-ethylpyridine by dehydrogenation, the principal separation is a combined steam and vacuum distillation to make a separation between 2-methyl-5-ethylpyridine and 2-methyl-5-vinylpyridine. Because this is a difficult separation, due to the proximity of the boiling points of the stated components, considerable polymerization of the 2-methyl-5-vinylpyridine occurs. After a short period of time operation of the column becomes impossible because of an insoluble polymer which forms in the lower part of the fractionating column and in the kettle. However, by the use of salts of dithiocarbamic acid in accordance with this invention shut-downs due to the formation of insoluble polymer are largely eliminated. I have found that when the object is merely to stabilize the distillate by the inhibition of insoluble polymer formation the disclosed inhibiting agents can be employed in the lowest proportion which will desirably inhibit the formation of insoluble polymer. For such purpose the feed to the distillation column can be treated with from 0.01 percent to 1.0 percent by weight of the inhibiting agent, based on the weight of the vinyl-substituted heterocyclic compound having a hetero nitrogen atom. In many instances, when a concentration of the disclosed inhibiting agents used is greater than 1.0 percent by weight based on the weight of the vinyl-substituted heterocyclic compound having a hetero nitrogen atom, i.e., from 1.0 to 5.0 percent by weight, the formation of soluble polymer is inhibited during distillation as well as the formation of insoluble polymer. It is to be noted that the inhibiting agents disclosed herein can be added directly to the reflux of the distillation column rather than to the feed mixture in an amount sufficient to stabilize the vinylpyridines depending on operating conditions then being utilized, and in many cases it will be found that a smaller quantity of inhibiting agent is required to produce a stabilized product when this method is followed than when the inhibiting agents are added to the feed mixture.

In practicing the invention, for example in the separation of 2-methyl-5-vinylpyridine from 2-methyl-5-ethylpyridine and lighter material, the mixture can be distilled in a combined steam-vacuum unit operated with a top tower pressure of 100 millimeters mercury absolute. Sufficient steam is added to the unit to maintain a temperature of 185° F. in the reboiler. The 2-methyl-5-vinylpyridine is withdrawn at the bottom of the unit and 2-methyl-5-ethylpyridine of sufficient purity for recycle purposes is obtained as an overhead product. In this column insoluble polymer formation has been particularly troublesome prior to the use of this invention.

It will be understood that the foregoing disclosure is illustrative and that other embodiments within the scope of the invention will occur to those skilled in the art. Those skilled in the art will appreciate, for instance, that for the purposes of this invention, vinyl-substituted heterocyclic compounds having a hetero nitrogen atom further substituted with non-interfering groups, for example, halo-, nitro-, amino-, hydroxyl-, and carboxyl-, are the same as nonsubstituted vinyl heterocyclic compounds having a hetero nitrogen atom.

I claim:
1. A method for inhibiting the polymerization of 2-methyl-5-vinylpyridine against popcorn polymer formation which comprises treating said 2-methyl-5-vinylpyridine with an amount sufficient to effect said inhibition of sodium dimethyl-dithiocarbamate.
2. A method for inhibiting the polymerization of 2-methyl-5-vinylpyridine against popcorn polymer formation which comprises treating said 2-methyl-5-vinylpyridine with an amount sufficient to effect said inhibition of potassium dimethyl-dithiocarbamate.
3. A method for inhibiting the polymerization of 2-methyl-5-vinylpyridine against popcorn polymer formation which comprises treating said 2-methyl-5-vinylpyridine with from 0.01 percent to 5.0 percent by weight, based on the 2-methyl-5-vinylpyridine, of sodium dimethyl-dithiocarbamate.
4. A method for inhibiting the polymerization of 2-methyl-5-vinylpyridine against popcorn polymer formation which comprises treating said 2-methyl-5-vinylpyridine with from 0.01 percent to 5.0 percent by weight, based on the 2-methyl-5-vinylpyridine, of potassium dimethyl-dithiocarbamate.
5. A method of stabilizing a heterocyclic nitrogen base selected from the group consisting of compounds having the formulae

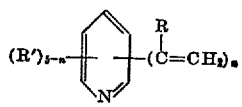
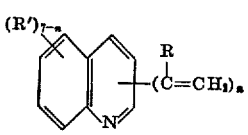
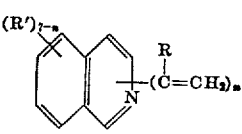

wherein $n$ is an integer selected from the group consisting of 1 and 2, R is selected from the group consisting of H, $CH_3$, and $C_2H_5$, and each R' is individually selected from the group consisting of H and an alkyl group, not more than 12 carbon atoms being present in the total of said R' groups, against popcorn polymer formation, which comprises treating said heterocyclic nitrogen base with a compound selected from the group consisting of compounds according to the general formula

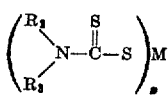

wherein M is a member selected from the group consisting of alkali-metals, alkaline earth metals, and ammonium, $x$ is an integer selected from the group consisting of 1 and 2, and $R_2$ and $R_3$ are selected from the group consisting of H, methyl, ethyl, propyl, butyl, amyl, and methylene radicals which, when joined together, form with the nitrogen atom, a piperidine ring.
6. The method of claim 5 wherein the heterocyclic nitrogen base is treated with about 0.01 to about 5.0 weight percent, based on said heterocyclic nitrogen base, of sodium dimethyl-dithiocarbamate.
7. The method of claim 5 wherein the heterocyclic nitrogen base is treated with about 0.01 to about 5.0 weight percent, based on said heterocyclic nitrogen base, of potassium dimethyl-dithiocarbamate.

8. A polymerizable heterocyclic base selected from the group consisting of compounds having the general formulae

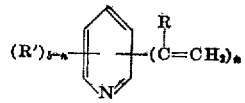
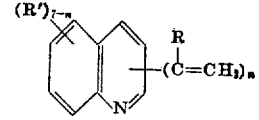
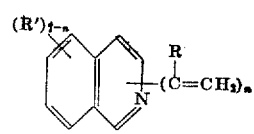

wherein $n$ is an integer selected from the group consisting of 1 and 2, R is selected from the group consisting of H, $CH_3$ and $C_2H_5$, and each R' is individually selected from the group consisting of H and an alkyl group, not more than 12 carbon atoms being present in the total of said R' groups, said heterocyclic base being stabilized against popcorn polymer formation, by the addition of a stabilizing amount of a compound selected from the group consisting of compounds according to the general formula

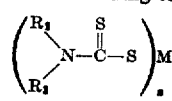

wherein M is a member selected from the group consisting of alkali-metals, alkaline earth metals, and ammonium, $x$ is an integer selected from the group consisting of 1 and 2, and $R_2$ and $R_3$ are selected from the group consisting of H, methyl, ethyl, propyl, butyl, amyl, and methylene radicals which, when joined together, form with the nitrogen atom, a piperidine ring.
9. 5-methyl-2-vinyl pyridine stabilized against popcorn polymer formation, with about 0.01 to about 5.0 weight percent of potassium dimethyl-dithiocarbamate.
10. 5-methyl-2-vinyl pyridine stabilized against popcorn polymer formation with about 0.01 to about 5.0 weight percent of sodium dimethyl-dithiocarbamate.
11. A method of stabilizing 5-methyl-2-vinyl pyridine against popcorn polymer formation which comprises treating said pyridine with a stabilizing amount of a compound selected from the group consisting of compounds according to the general formula

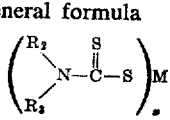

wherein M is a member selected from the group consisting of alkali-metals, alkaline earth metals, and ammonium, $x$ is an integer selected from the group consisting of 1 and 2, and $R_2$ and $R_3$ are selected from the group consisting of H, methyl, ethyl, propyl, butyl, amyl, and methylene radicals which, when joined together, form with the nitrogen atom, a piperidine ring.
12. A method of stabilizing a polymerizable vinylpyridine compound against popcorn polymer formation with a stabilizing amount of a compound selected from the group consisting of compounds represented by the general formula

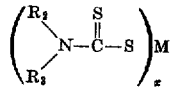

wherein M is a member selected from the group consisting of alkali-metals, alkaline earth metals, and ammonium, $x$ is an integer selected from the group consisting of 1 and 2, and $R_2$ and $R_3$ are selected from the group consisting of H, methyl, ethyl, propyl, butyl, amyl, and methylene radicals which, when joined together, form with the nitrogen atom, a piperidine ring.

13. A polymerizable vinylpyridine compound stabilized against popcorn polymer formation by the addition of a stabilizing amount of a compound selected from the group consisting of compounds represented by the general formula

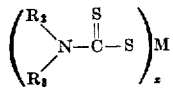

wherein M is a member selected from the group consisting of alkali-metals, alkaline earth metals, and ammonium, $x$ is an integer selected from the group consisting of 1 and 2, and $R_2$ and $R_3$ are selected from the group consisting of H, methyl, ethyl, propyl, butyl, amyl, and methylene radicals which, when joined together, form with the nitrogen atom, a piperidine ring.

References Cited in the file of this patent

UNITED STATES PATENTS

| 2,386,272 | Schulze | Oct. 9, 1945 |
| 2,512,660 | Mahan | June 27, 1950 |
| 2,556,845 | Kauffman | June 12, 1951 |
| 2,592,625 | Wagner | Apr. 15, 1952 |

OTHER REFERENCES

Dunbrook et al.: Official Gazette, vol. 644, pp. 623–4 (1951).

Frank et al.: J. Am. Chem. Soc., vol. 68, p. 908 (1946).